(12) United States Patent
Lee et al.

(10) Patent No.: US 12,304,586 B1
(45) Date of Patent: May 20, 2025

(54) BICYCLE HEADLIGHT SYSTEM

(71) Applicant: EISO ENTERPRISE CO., LTD., Taoyuan (TW)

(72) Inventors: Yi-Hsiung Lee, Taoyuan (TW); Hung-Ching Tu, Taoyuan (TW)

(73) Assignee: EISO ENTERPRISE CO., LTD., Taoyuan (TW)

( * ) Notice: Subject to any disclaimer, the term of this patent is extended or adjusted under 35 U.S.C. 154(b) by 0 days.

(21) Appl. No.: 18/608,086

(22) Filed: Mar. 18, 2024

(51) Int. Cl.
*B62J 6/028* (2020.01)
*B62J 6/055* (2020.01)

(52) U.S. Cl.
CPC ............... *B62J 6/028* (2020.02); *B62J 6/055* (2020.02)

(58) Field of Classification Search
CPC ..... B62J 6/028; B62J 6/055; B62J 6/02; B62J 6/022; F21V 23/0442; F21W 2107/13
See application file for complete search history.

(56) References Cited

U.S. PATENT DOCUMENTS

| | | | | |
|---|---|---|---|---|
| 2015/0070919 A1* | 3/2015 | Howe | ...................... | B62J 6/165 |
| | | | | 362/476 |
| 2020/0010136 A1* | 1/2020 | Yun | ...................... | H05B 47/115 |
| 2020/0189678 A1* | 6/2020 | Phillip | ...................... | B62J 6/045 |
| 2023/0029461 A1* | 2/2023 | Ebrahemi | ................ | B62J 6/057 |

FOREIGN PATENT DOCUMENTS

| | | |
|---|---|---|
| CN | 116552369 | 8/2023 |
| DE | 102019123312 | 1/2021 |
| TW | 201600374 | 1/2016 |
| TW | I564203 | 1/2017 |
| TW | 201734362 | 10/2017 |
| TW | M626668 | 5/2022 |
| TW | I774279 | 8/2022 |

* cited by examiner

*Primary Examiner* — Bao Q Truong
(74) *Attorney, Agent, or Firm* — Muncy, Geissler, Olds & Lowe, P.C.

(57) ABSTRACT

A bicycle headlight system includes a headlight and two fill lights, the headlight maintains light projection when the bicycle headlight system is activated, the two fill lights are controlled respectively, the two fill lights have the headlight as a reference axis, the two fill lights project lights toward two sides of the reference axis, and each of the two fill lights is activated based on a direction light trigger signal.

6 Claims, 5 Drawing Sheets

BICYCLE HEADLIGHT SYSTEM

FIELD OF THE INVENTION

The invention relates to a bicycle headlight system, and in particular to a bicycle headlight system in which a fill light is driven by a directional light triggering signal.

BACKGROUND OF THE INVENTION

The existing bicycle fill light mechanism can be mainly categorized into two types, one is to drive a headlight to rotate when a vehicle body turns, as disclosed in TW 1774279B, TW M626668U, and DE 102019123312B. Such a type does not install an additional fill light on a lamp. Instead, a gyroscope is provided to determine a tilted direction of the vehicle body and then drives the headlight to rotate toward the tilted direction of the vehicle body.

The other is to install additional fill light on the lamp, as disclosed in CN 116552369A, TW 201600374A, and TW 1564203B. Such a type provides the gyroscope to determine whether to fill a light to the bicycle headlight, and the filled light additionally provided is driven after the gyroscope determines the tilted direction of the vehicle body, and then fill the light in the tilted direction of the vehicle body.

As can be seen from the above, the existing bicycle fill light mechanism provides the gyroscope to determine whether to fill the light or not. However, in the practice of bicycle riding, the tilt of the bicycle may be caused not only by turning the bicycle, but also by the rider stepping on the pedals to shake the bicycle body and resulted in the tilt of the bicycle, such that making the gyroscope determine the bicycle body is tilted and falsely drive the function of filling light.

SUMMARY OF THE INVENTION

A main object of the invention is to solve the problem of using gyroscopes as a judgment mechanism for filling lights to the headlights of conventional bicycles.

In order to achieve the above object, the invention provides a bicycle headlight system, which includes a headlight and two fill lights. The headlight maintains light projection when the bicycle headlight system is activated. The two fill lights are controlled respectively. The two fill lights have the headlight as a reference axis, and the two fill lights project lights toward two sides of the reference axis. Each of the two fill lights is activated based on a direction light trigger signal.

In one embodiment, a source of the direction light trigger signal is a direction light controller or an intelligent electronic terminal device.

In one embodiment, the bicycle headlight system receives the direction light trigger signal in a manner of wiring or wireless.

In one embodiment, the bicycle headlight system comprises a vehicle sensing component to force the two fill lights not being activated upon sensing oncoming vehicles.

In one embodiment, the bicycle headlight system comprises a control module provided for controlling the headlight and the two fill lights.

In one embodiment, the bicycle headlight system comprises a light housing, and the headlight and the two fill lights are disposed in the light housing.

Through the foregoing implementation of the invention, compared with the prior art, the invention has the following characteristics: the two fill lights of the present invention are no longer based on a tilted direction of the bicycle as a judgment mechanism, but rather based on the direction light trigger signal for activation, so as to improve shortcomings of the conventional filling light mechanism for the bicycle.

DETAILED DESCRIPTION OF THE PREFERRED EMBODIMENTS

The detailed description and technical content of the invention are described below with reference to the accompanying drawings.

Figure 2:
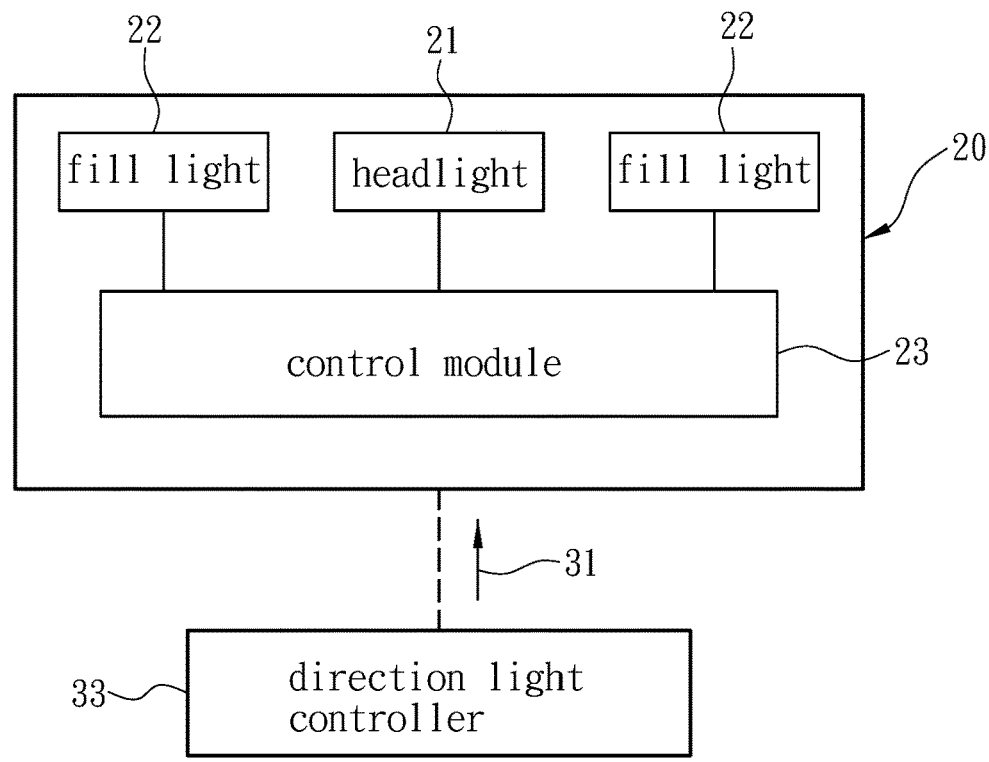
FIG. 2 is a second block diagram of another embodiment of the invention.
Figure 3:
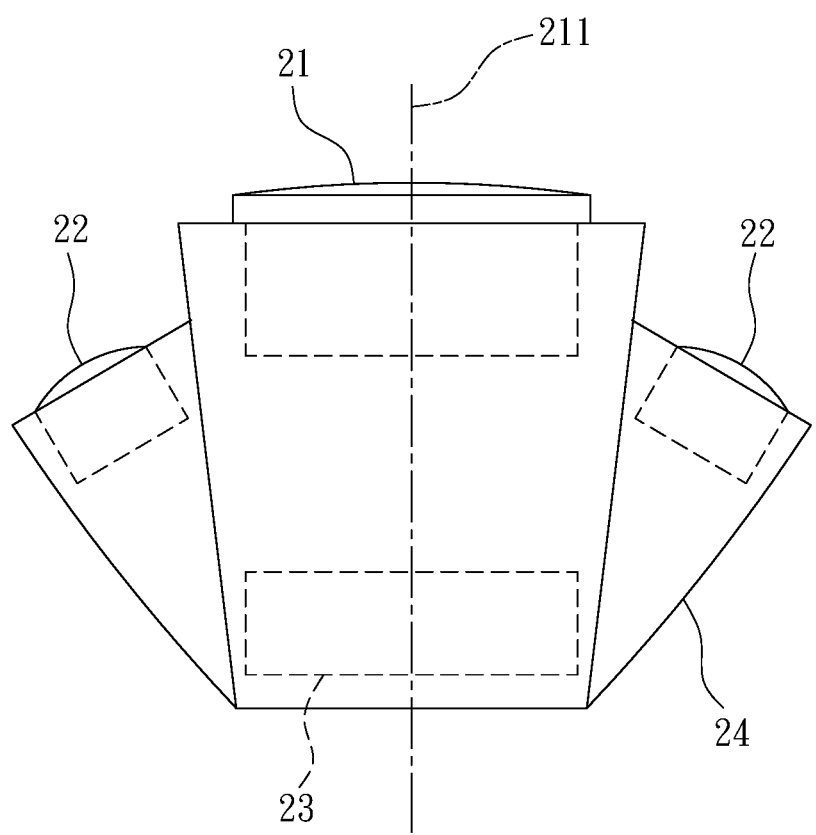
FIG. 3 is a structural diagram of an embodiment of the invention.
Figure 4:
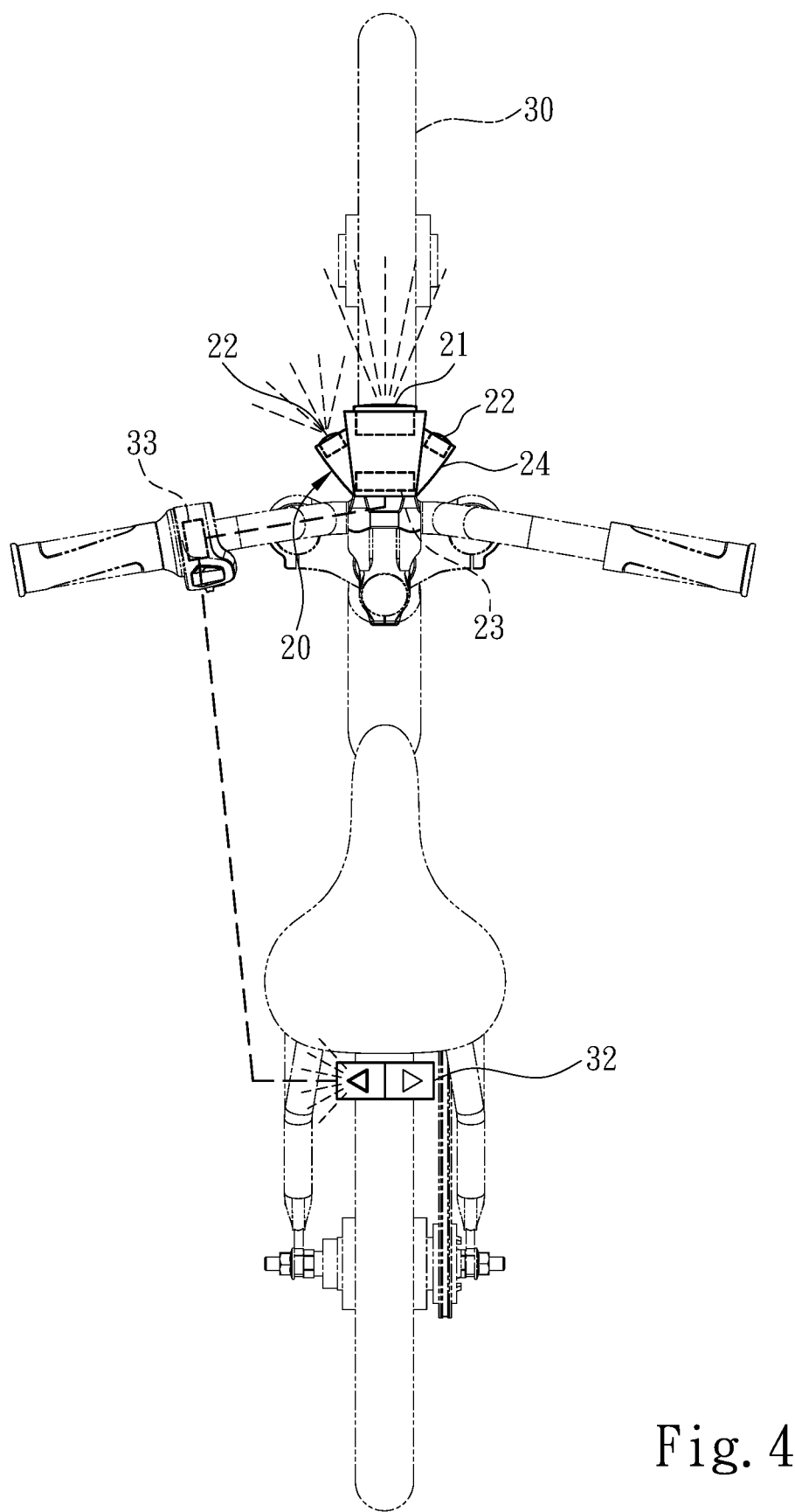
FIG. 4 is a first schematic implementation diagram of an embodiment of the invention.
Figure 5:
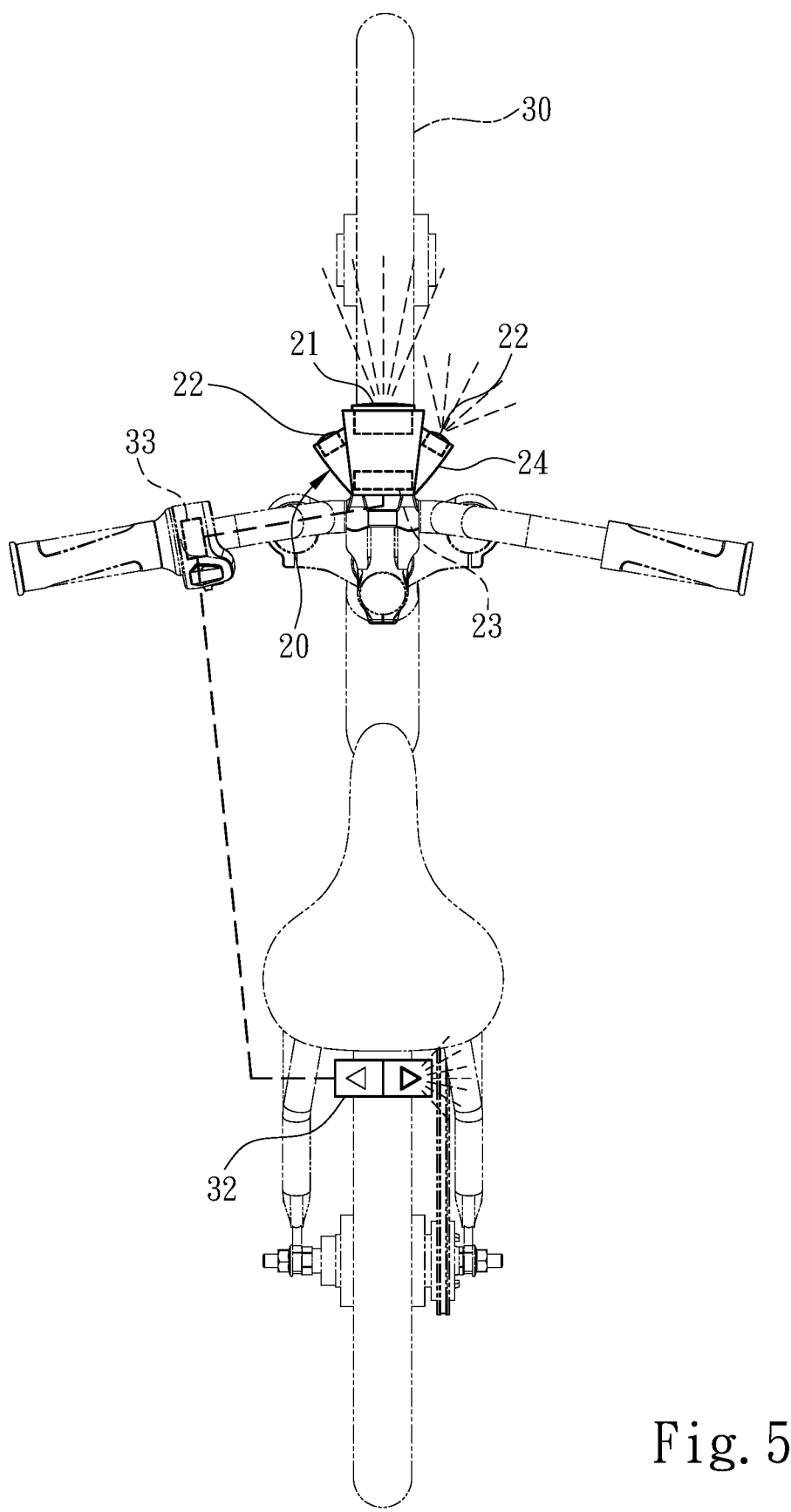
FIG. 5 is a second schematic implementation diagram of an embodiment of the invention.

Please refer to FIG. 1, FIG. 2, FIG. 3, FIG. 4 and FIG. 5. The invention provides a bicycle headlight system 20 provided on a bicycle 30, the bicycle headlight system 20 includes a headlight 21 and two fill lights 22, and the headlight 21 maintains light projection when the bicycle headlight system 20 is activated to illuminate roads in front of the bicycle 30. The two fill lights 22 provide a fill light function in the bicycle headlight system 20. The two fill lights 22 are controlled respectively, the two fill lights 22 have the headlight 21 as a reference axis 221, and the two fill lights 22 project lights toward two sides of the reference axis 221. It is worth noting that a range of illumination of the two fill lights 22 does not full overlap with a range of illumination of the headlight 21, thereby making up for a blind spot of the headlight 21 during lighting. Further, each of the two fill lights 22 is activated based on a direction light trigger signal 31. Specifically, the direction light trigger signal 31 is provided for driving a direction light 32 on the bicycle 30 to generate a turning direction indication, and each of the two fill lights 22 projects accordingly when the direction light 32 generates the turning direction indication. For example, the headlight 21 projects light upon being activated, and when the direction light trigger signal 31 triggers a left turn indication of the direction light 32, one of the two fill lights 22 located on a left side of the headlight 21 is activated to fill a light to the left side of the headlight 21, as shown in FIG. 4. Conversely, when the directional light trigger signal 31 triggers a right turn indication of the direction light 32, the other one of the two fill lights 22 located on a right side of the headlight 21 is activated to fill the light to the right side of the headlight 21, as shown in FIG. 5.

It can be understood from the above that the two fill lights 22 of the invention do not use conventional gyroscopes to determine whether to fill the light or not, but instead use the direction light trigger signal 31, thereby when a bicycle body is tilted but not caused by a turning during riding, a situation in which the fill light function being falsely activated is improved.

Figure 1:
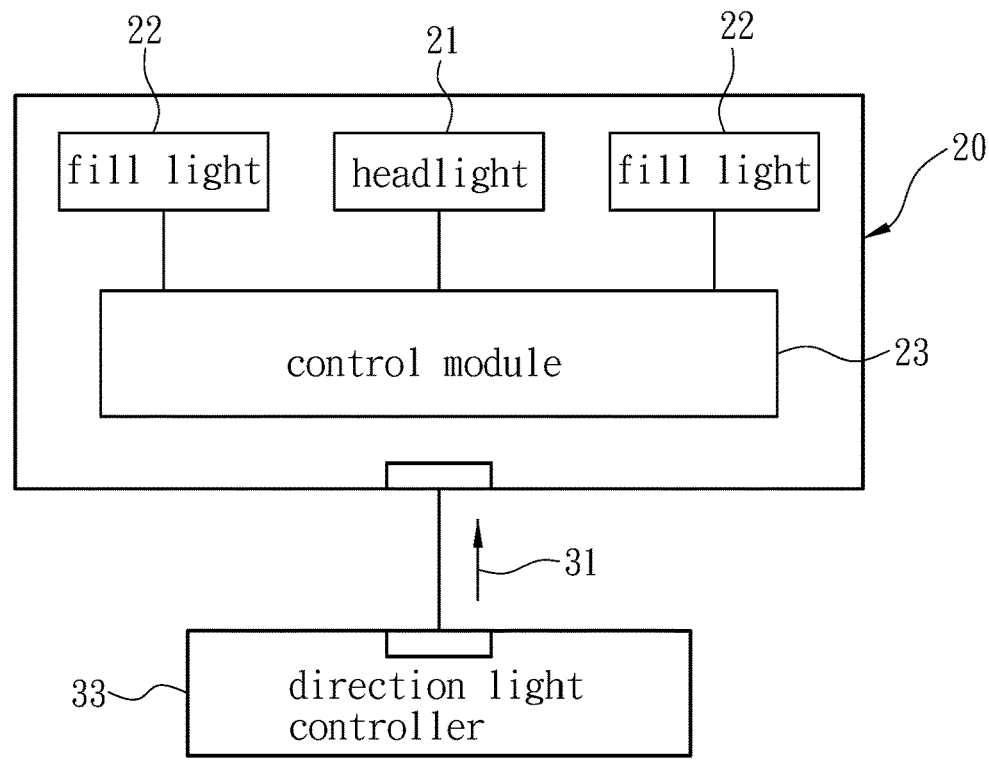
FIG. 1 is a first block diagram of an embodiment of the invention.

In one embodiment, please refer to FIG. 1 and FIG. 2, the bicycle headlight system 20 receives the direction light trigger signal 31 in a manner of wiring or wireless. More specifically, a source of the direction light trigger signal 31 is a direction light controller 33 or an intelligent electronic terminal device (not shown). The direction light controller 33 or the intelligent electronic terminal device is provided for controlling the direction light 32. That is to say, when the direction light controller 33 or the intelligent electronic terminal device is operated, the direction light trigger signal 31 is transmitted to the direction light 32 and drives the direction light 32 to generate the turning direction indication, and the two fill lights 22 are activated based on the direction light trigger signal 31. In this embodiment, the direction light controller 33 may be a controller integrated with a control function of the direction light 32, such as a bicycle odometer, etc., or may be a controller independently equipped with the control function of the direction light 32, and the intelligent electronic terminal device may be a smartphone, etc. In an embodiment, the controller may be provided with a mechanism for in triggering and activating the two fill lights 22 simultaneously as warning flashing or reminder flashing. The said mechanism for simultaneously triggering the two fill lights 22 is not limited to capturing the direction light trigger signal 31. In one embodiment, the two fill lights 22 may be forced to be activated simultaneously by a forced activation signal transmitted to the two fill lights 22, the forced activation signal may be generated by triggering an independent button on the controller.

Please refer to FIG. 1, FIG. 2, and FIG. 3, the bicycle headlight system 20 of the present invention is provided with the two fill lights 22 for capturing the direction light trigger signal 31, i.e., the two fill lights 22 are equipped with a control function on its own. In addition, the bicycle headlight system 20 may also be provided with a control module 23 independent of the two fill lights 22 and electrically connected to the two fill lights 22 and the headlight 21, the control module 23 controls the headlight 21 for projecting light and captures the direction light trigger signal 31 to control the two fill lights 22. In another embodiment, please refer to FIG. 3, the bicycle headlight system 20 of the present invention includes a light housing 24, and the headlight 21 and the two fill lights 22 are disposed in the light housing. In one embodiment, the control module 23 is also integrated into the light housing 24. It is worth noting that a structure of the bicycle headlight system 20 shown in FIG. 3 of the present invention is only a simple illustration and is not limited to a shape thereto.

Figure 6:
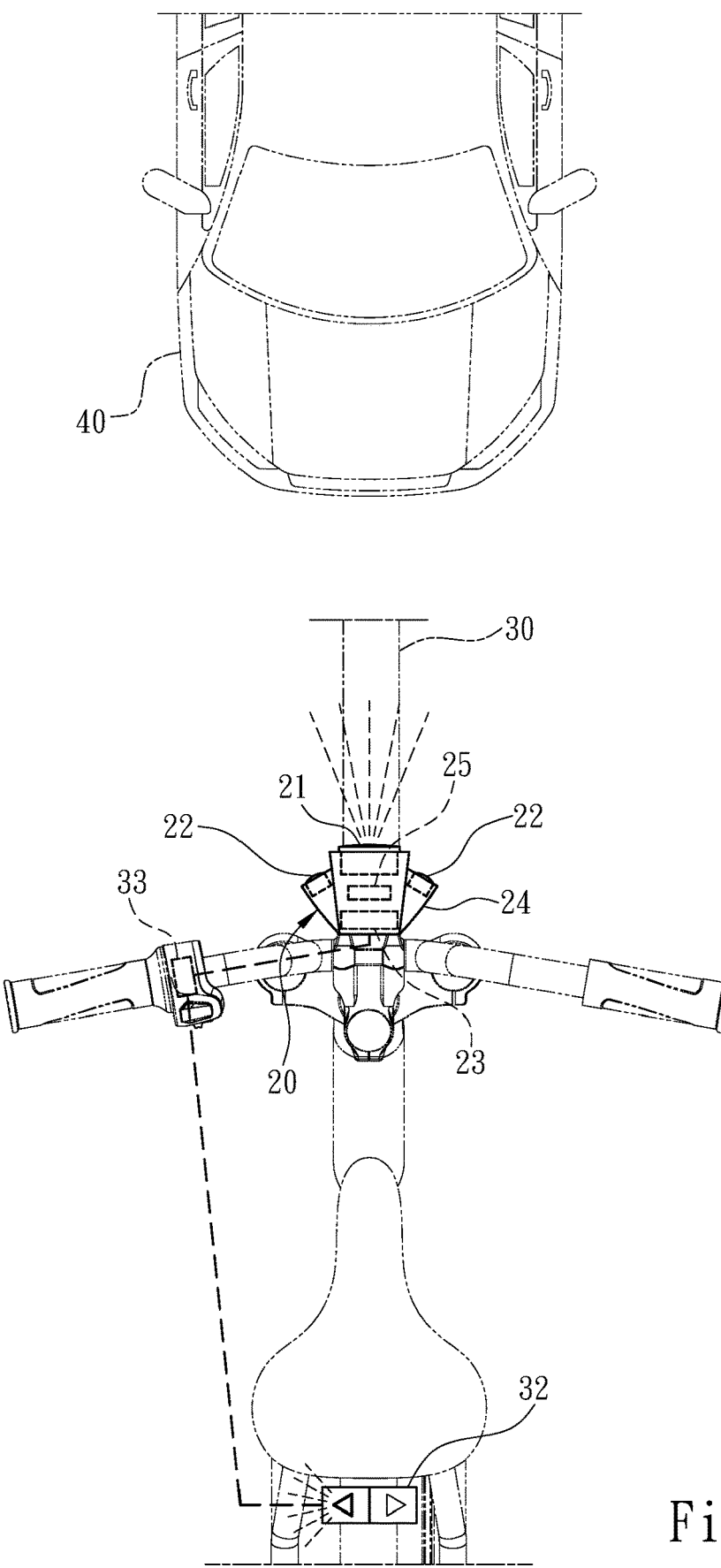
FIG. 6 is a third schematic implementation diagram of an embodiment of the invention.

On the other hand, please refer to FIG. 6. In order to prevent the fill light function from affecting oncoming vehicles 40 in opposite directions, in an embodiment, the bicycle headlight system 20 of the present invention includes a vehicle sensing component 25 located in a position that has to meet basic conditions that sense the oncoming vehicles 40 in opposite directions, and the vehicle sensing component 25 forces the two fill lights 22 not to be activated when sensing the oncoming vehicles 40 in opposite directions. The vehicle sensing component 25 may be a radar, an infrared ray, and a light receiving sensor. When the vehicle sensing component 25 is the light receiving sensor, a timing of the vehicle sensing component 25 controlling the two fill lights 22 not activated is that the light receiving sensor generates a current which is greater than a threshold value, upon receiving a light source.

What is claimed is:

1. A bicycle headlight system, comprising
  a headlight, maintaining light projection when the bicycle headlight system is activated;
  two fill lights, being controlled respectively, the headlight is provided as a reference axis for the two fill lights, the two fill lights projecting lights on two sides of the reference axis, and each of the two fill lights being activated based on a direction light trigger signal; and
  a vehicle sensing component, forcing the two fill lights not being activated upon sensing oncoming vehicles.

2. The bicycle headlight system as claimed in claim 1, wherein a source of the direction light trigger signal is a direction light controller or an intelligent electronic terminal device.

3. The bicycle headlight system as claimed in claim 1, wherein the bicycle headlight system receives the direction light trigger signal in a manner of wiring or wireless.

4. The bicycle headlight system as claimed in claim 1, wherein the bicycle headlight system comprises a control module provided for controlling the headlight and the two fill lights.

5. The bicycle headlight system as claimed in claim 4, wherein the bicycle headlight system comprises a light housing, and the headlight and the two fill lights are disposed in the light housing.

6. The bicycle headlight system as claimed in claim 1, wherein the bicycle headlight system comprises a light housing, and the headlight and the two fill lights are disposed in the light housing.

* * * * *